United States Patent
Miller, Jr. et al.

(10) Patent No.: US 6,356,356 B1
(45) Date of Patent: Mar. 12, 2002

(54) SYSTEM AND METHOD FOR TRANSMITTING A FAX TO AN E-MAIL ADDRESS

(75) Inventors: Donald W. Miller, Jr., Plano; Kathryn J. Brandt, Dallas, both of TX (US)

(73) Assignee: Alcatel USA Sourcing, L.P., Plano, TX (US)

(*) Notice: Subject to any disclaimer, the term of this patent is extended or adjusted under 35 U.S.C. 154(b) by 0 days.

(21) Appl. No.: 09/212,828

(22) Filed: Dec. 16, 1998

(51) Int. Cl.⁷ .............................................. G06F 15/00
(52) U.S. Cl. .................. 358/1.15; 358/402; 379/100.08
(58) Field of Search ............................. 358/1.15, 402, 358/407, 440, 448; 382/317; 379/100.01, 100.06, 100.07, 100.08

(56) References Cited

U.S. PATENT DOCUMENTS

| | | | | |
|---|---|---|---|---|
| 5,790,639 A | * | 8/1998 | Ranalli et al. | 379/100.08 |
| 5,859,967 A | * | 1/1999 | Kaufeld et al. | 395/186 |
| 6,025,931 A | * | 2/2000 | Bloomfield | 358/402 |
| 6,104,500 A | * | 8/2000 | Alam et al. | 358/1.15 |

FOREIGN PATENT DOCUMENTS

WO    WO 96/41463    * 12/1996

* cited by examiner

*Primary Examiner*—Kimberly A. Williams
(74) *Attorney, Agent, or Firm*—Baker Botts L.L.P.

(57) ABSTRACT

A system for sending a fax to one or more e-mail addresses is provided which consists of a fax interceptor (28), a scanner (34), an e-mail creator (36) and an e-mail sender (38). The fax interceptor (28) receives a fax transmission and, using the scanner (34), scans the fax searching for destination e-mail addresses. The e-mail creator (36) creates an e-mail message addressed to each destination e-mail address. The e-mail creator (36) also attaches the fax image to each e-mail message. The e-mail sender (38) sends the created e-mail message to the destination e-mail addresses.

18 Claims, 3 Drawing Sheets

SYSTEM AND METHOD FOR TRANSMITTING A FAX TO AN E-MAIL ADDRESS

TECHNICAL FIELD OF THE INVENTION

This invention relates in general to the field of transmission and reception of facsimiles and electronic mail, and more particularly to a system and method for transmitting a fax to an e-mail address.

BACKGROUND OF THE INVENTION

Prior to facsimile (Fax) machines and electronic mail (e-mail) accounts, persons and businesses who desired to send written communications to another person or business were forced to produce the written communication and send it to the recipient via a traditional delivery method. These traditional delivery methods included hand delivery, United States Postal Service delivery, or a third party service to deliver the written communication. These prior methods were time consuming for both the sender and recipient. In addition, the delivery process itself could take several days.

An improvement to the prior delivery methods was the introduction of the fax machine. The fax machine was capable of scanning a document and converting that document into a digital, or bit-mapped, image. That image was then transmitted across the public switched telephone network (PSTN) utilizing an appropriate telephony communication protocol. The digitized document is referred to as a facsimile, or fax. The recipient of the fax was required to have a fax machine in order to receive the fax communication. This allowed instantaneous transmission of documents, but required both the sender and recipient to have a fax machine attached to the PSTN.

Another improvement to the prior delivery methods was the introduction of widespread Internet electronic mail accounts. The Internet is a landline based system which is separate from the PSTN and uses an Internet Protocol for communications rather than one of the telephony communication protocols. The reason for this difference is that telephony communication protocols are designed for the transmission of voice communications whereas the Internet Protocol is designed for transmission of data communications. Since the transmission of written communications is primarily a data transmission function, the Internet Protocol is better suited to this task. However, sending and receiving e-mail requires both the sender and the recipient to have a computer with modem attached to a computer network such as the Internet.

Intranets are similar to the Internet except that access is not open to the public. Intranets are generally used to connect businesses, corporations, or universities which have several local area networks in diverse locations which require communications between the nodes attached to each local area network. Intranets utilize communications protocols similar to the Internet.

Current technology utilizes computers to transmit text messages to other persons via the Internet or Intranet. However, if one wishes to send a fax from a computer, the computer must have special software and a fax board.

Fax transmissions and e-mail transmissions follow different signal paths and use incompatible technologies. For example, a person with a fax machine cannot send a fax to an e-mail account, and a person who is capable of sending e-mail messages cannot send an e-mail message to a fax machine.

Due to the aforementioned problems, current methods of electronically transmitting written communications are incompatible and require the purchase and maintenance of separate machines to transmit a fax or an e-mail message.

SUMMARY OF THE INVENTION

From the foregoing, it may be appreciated that a need has arisen for an improved system and method for transmitting a fax to an e-mail address. In accordance with the present invention, a system and method for transmitting a fax to an e-mail address is provided which substantially eliminates or reduces disadvantages and problems associated with supporting these incompatible technologies.

According to one embodiment of the present invention, there is provided a fax/e-mail server with a fax interceptor which is capable of receiving a fax transmission from a source fax machine. The fax/e-mail server through its scanning module locates one or more e-mail addresses within the received fax transmission. The fax/e-mail server also contains an e-mail creator which generates an e-mail to the e-mail addresses and attaches the fax for transmission to the e-mail addresses. Finally, the fax/e-mail server contains an e-mail sender which transmits the generated faxes to the e-mail addresses.

The present invention provides various technical advantages over current text communication technologies. For example, one technical advantage is to eliminate the need for the recipient of the communication to have a similar machine in order to receive and view the communication. Another technical advantage is to eliminate the need for additional hardware and software in a computer in order to make the computer operable to receive and send fax communications. Other examples may be readily ascertainable by those skilled in the art from the following figures, description, and claims.

BRIEF DESCRIPTION OF THE DRAWINGS

For a more complete understanding of the present invention and the advantages thereof, reference is now made to the following description taken in conjunction with the accompanying drawings, wherein like reference numbers represent like parts, and in which.

DETAILED DESCRIPTION OF THE INVENTION

Figure 1:
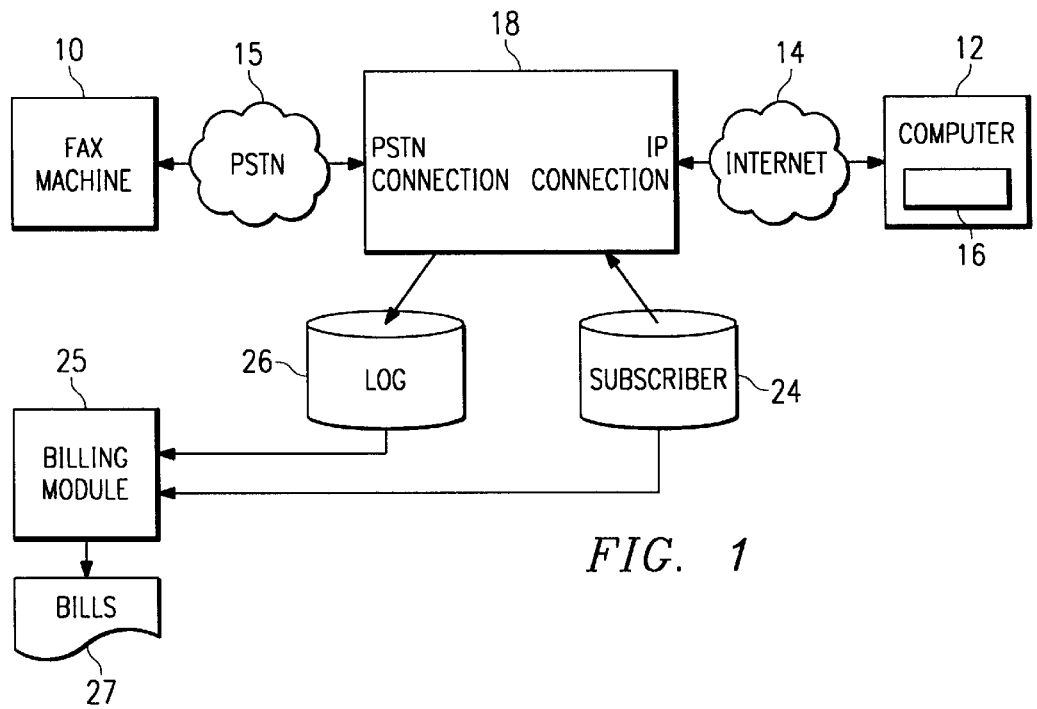
FIG. 1 is a block diagram illustrating the basic components of the inventive system including a fax/e-mail server interposed between a fax machine and a computer.

Referring to FIG. 1, a facsimile (fax) machine 10 is coupled to a computer 12 via an Internet 14. Internet 14 as used in this specification and the accompanying drawings is used to represent both the Internet and a private Intranet. Internet 14 is used here to refer generically to any network which is capable of sending and receiving e-mail messages. Fax machine 10 is capable of scanning a document and digitizing the information into a bit mapped image suitable for transmission across public switched telephone network (PSTN) lines 15 or a similar telecommunications network to another fax machine. Computer 12 runs an electronic mail (e-mail) administration program which has access to an e-mail account 16. E-mail account 16 is assigned a unique identifier so that e-mail messages can be received from any computer connected to Internet 14. Fax machine 10 is connected to PSTN 15 and has a unique telephone number so that facsimile (fax) transmissions can be received from any fax machine connected to PSTN 15.

A fax/e-mail server 18 is interposed between fax machine 10 and computer 12. Fax machine 10 is coupled to fax/e-mail server 18 by PSTN 15. Although telephony protocols for communications across PSTN 15 are optimized for voice transmissions, they are capable of transmitting data. Fax machines transmit data between one another using PSTN 15 lines and telephony communication protocols. Computer 12 is coupled to fax/e-mail server 18 via Internet 14. The connection from computer 12 most likely originates as a PSTN connection to an Internet service provider (ISP) switch, or similar switch, which then accesses Internet 14. However, it is possible for computer 12 to have a direct connection to Internet 14. Therefore, fax/e-mail server 18 has connections to both PSTN 15 and Internet 14. Fax/e-mail server 18 functions as a gateway linking the incompatible technologies of fax transmissions and e-mail transmissions.

The system of the present invention may also contain a subscriber database 24, which is connected to fax/e-mail server 18, for use in limiting access to fax/e-mail server 18. Access may be limited to active subscribers in subscriber database 24 which have signed up for one of the services available through fax/e-mail server 18. Two of the possible services available through fax/e-mail server 18 are a fax-to-e-mail service and an e-mail-to-fax service. A log file 26 may be linked to fax/e-mail server 18 and may be capable of tracking all fax to e-mail transmissions and e-mail to fax transmissions. Log file 26 may be used to bill users of fax/e-mail server 18 for their use of the system.

A billing module 25 implements an optional billing feature which may be part of the inventive system. If the service provider elects to charge for the fax to e-mail or e-mail to fax service, log file 26 provides the details that may be may be used to create such bills. A variety of billing options are possible including billing for each use of the service, billing for each use of the service depending upon the geographic region of the destination, or charging a flat fee for access to the service. Billing module 25 may receive as input log file 26 and produce a billing invoice 27 for each subscriber in subscriber database 24.

As previously stated, fax/e-mail server 18 is a connection between two incompatible technologies. Fax technology is based on digitizing documents into bit mapped images for transmission across PSTN 15 using traditional telephone communication protocols which are optimized for voice transmission. E-mail communications send text documents and a variety of other file formats through Internet 14 using an Internet communication protocol. Currently, the transmission protocols used for fax machines and e-mail messages are incompatible. However, fax/e-mail server 18 makes possible the transmission of a fax to one or more e-mail accounts and the transmission of an e-mail message to one or more fax machines.

Figure 2:
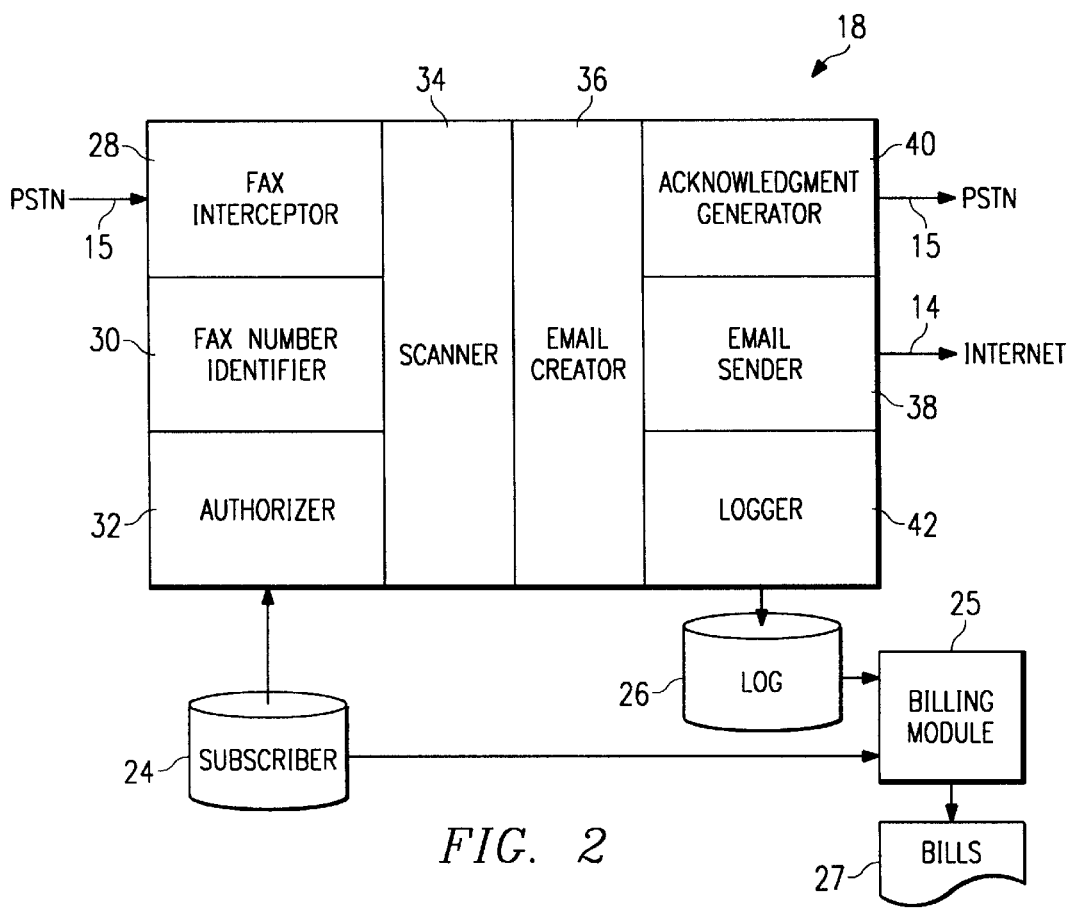
FIG. 2 is a block diagram illustrating a fax/e-mail server with components which may be used to transmit a fax to an e-mail address.

Referring to FIG. 2, fax/e-mail server 18 is illustrated with component parts which may be used to transmit a fax to one or more e-mail addresses. Fax/e-mail server 18 may have two primary functions, accepting fax transmissions and forwarding those transmissions to e-mail addresses and accepting e-mail messages and forwarding those messages to fax machines. Each of the primary functions consists of a set of modules. Some of these modules may be shared between the primary functions while some of the modules may be unique to each function. FIG. 2 illustrates the modules of fax/e-mail server 18 which may comprise the fax to e-mail function. Fax/e-mail server 18 may include a fax interceptor 28, a source telephone number identifier 30, an authorization module 32, a scanner 34, an e-mail creator 36, an e-mail sender 38, an acknowledgment generator 40, and a logger 42.

Fax/e-mail server 18 is connected to PSTN 15 through a unique telephone number. Users of the fax to e-mail service of fax/e-mail server 18 dial the unique telephone number assigned to fax/e-mail server 18 in order to transmit their fax to an e-mail address. Fax interceptor 28 receives and stores the fax transmission. If fax/e-mail server 18 is configured so that access is limited to subscribers in subscriber database 24, source telephone number identifier 30 determines the telephone number of the originating fax machine. This determination could be accomplished through a caller-ID function. Another use for source telephone number identifier 30 is if fax/e-mail server 18 is configured to send an acknowledgment message back to the originating fax machine.

If fax/e-mail server 18 is configured to limit access to subscribers in subscriber database 24, authorization module 32 accesses subscriber database 24 using the source telephone number determined in source telephone number identifier 30. If a subscriber in good standing exists in subscriber database 24 and that subscriber is eligible to send faxes to e-mail accounts, authorization module 32 allows fax/e-mail server 18 to continue its processing. Otherwise, authorization module 32 terminates the functions of fax/e-mail server 18. If fax/e-mail server 18 is appropriately configured, a message may be transmitted back to the originating fax machine indicating that the source telephone number is not authorized to use the fax to e-mail service of fax/e-mail server 18.

Scanner 34 scans the fax transmission stored by fax interceptor 28 and locates the destination e-mail address that is contained within the digital image. The fax transmission may contain more than one e-mail address in order to provide a broadcast capability. Broadcast capability refers to sending one fax message to several destination e-mail addresses. Scanner 34 may use optical character recognition (OCR) technology to locate the destination e-mail addresses within the digitized image. The provider of a fax to e-mail service on fax/e-mail server 18 may specify the location and format of the destination e-mail addresses within the fax transmission. By doing this, the time and effort used by scanner 34 can be minimized.

E-mail creator 36 generates an e-mail message which informs the recipients that they are receiving a fax transmission which may be attached to the e-mail. Another function of e-mail creator 36 is to attach the fax transmission stored by fax interceptor 28 to the outgoing e-mail message. E-mail sender 38 forwards the e-mail message created by e-mail creator 36 to the destination e-mail address via Internet 140 E-mail creator 36 generates the e-mail message for each destination e-mail address located by scanner 34.

If fax/e-mail server 18 is appropriately configured, an acknowledgment may be sent to the source telephone number indicating that the fax transmission has been delivered to the destination e-mail addresses Acknowledgment generator 40 produces this fax and transmits it to the source telephone number. The acknowledgment message may contain the date that the fax transmission was received, the time that the e-mail message was forwarded by fax/e-mail server 18, the total number of pages received in the fax transmission, the total number of pages sent to each e-mail address, and the destination e-mail addresses. The generated acknowledgment fax may then be sent to the source telephone number via PSTN 15

Fax/e-mail server 18 may log all uses of the fax to e-mail service in log file 26 so that appropriate detailed bill can be sent to subscribers. Log file 26 can also be used for system error detection and correction. Logger 42 may write detailed information regarding each fax to e-mail process performed by fax/e-mail server 18 to log file 26. This information would, at a minimum, identify the source telephone number, identify the destination e-mail address, identify the date and time that the fax was received and forwarded, and the number of pages received from the fax transmission and sent to the e-mail address. As discussed with reference to FIG. 1, an optional billing feature may be part of the inventive system by billing module 25 producing billing invoice 27.

Figure 3:
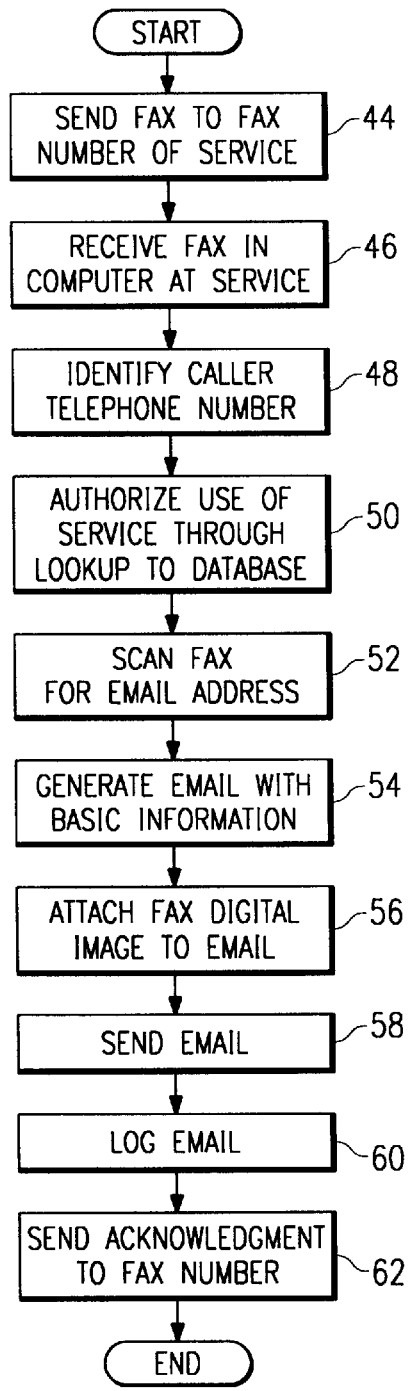
FIG. 3 is a flow diagram illustrating the steps which may be taken to send a fax to an e-mail address.

FIG. 3 is a flow diagram illustrating a methodology which may be used to send a fax to one or more e-mail addresses. Certain functions of this method are optional and may or may not be performed depending upon the configuration of fax/e-mail server 18. For instance, source telephone number identifier 30 may or may not determine the source telephone number, and authorization module 32 may or may not limit access to the fax to e-mail service. In addition, acknowledgment generator 40 may or may not send an acknowledgment to the source telephone number, and logger 42 may or may not track each use of the fax to e-mail service.

The process of receiving a fax transmission and forwarding it to an e-mail address commences at step 44 where fax machine 10 transmits a fax to the unique telephone number assigned to fax/e-mail server 18. The method then proceeds to step 46 where fax/e-mail server 18 receives the fax transmission in fax interceptor 28. Fax interceptor 28 also stores the fax transmission for use in a later step. The method then proceeds to step 48 where the source telephone number of fax machine 10 is identified if desired. Recall that the source telephone number is used if access to fax/e-mail server 18 is limited to subscribers in subscriber database 24, if acknowledgments are sent to the source telephone number, or if a log file 26 is maintained of all fax to e-mail uses of fax/e-mail server 18. The method then proceeds to step 50, where, if desired, the source telephone number located in step 48 is used to access subscriber database 24. Use of the fax to e-mail service is either authorized or denied depending upon the information retrieved.

The method then proceeds to step 52 where the fax transmission stored in step 46 is scanned to locate the destination e-mail address. The fax transmission may contain more than one destination e-mail address. Thus, step 52 will identify all destination e-mail addresses contained within the fax transmission. Once the destination e-mail addresses are determined, the method proceeds to step 54 where an e-mail message is generated to the destination e-mail addresses informing the recipients that a fax transmission is being forwarded to them. The method then proceeds to step 56 where the fax transmission stored in step 46 is attached to the e-mail messages generated in step 54. Note that the fax transmission is attached as a digital image so that the recipient receives exactly what would have been received through a standard fax machine. By doing this, interpretation errors which may occur when using OCR technology are avoided However, a scanned and interpreted text version of the fax could be sent instead of, or in addition to, the digital image version. The method then proceeds to step 58 where the e-mail messages generated in steps 54 and 56 are sent to the destination e-mail addresses via Internet 14 attached to fax/e-mail server 18.

The method then proceeds to step 60 where, if desired, detailed information regarding the fax to e-mail transmissions are logged in log file 26. The method then proceeds to step 62 where, if desired, an acknowledgment fax message is generated and transmitted to the source telephone number via PSTN 15.

Figure 4:
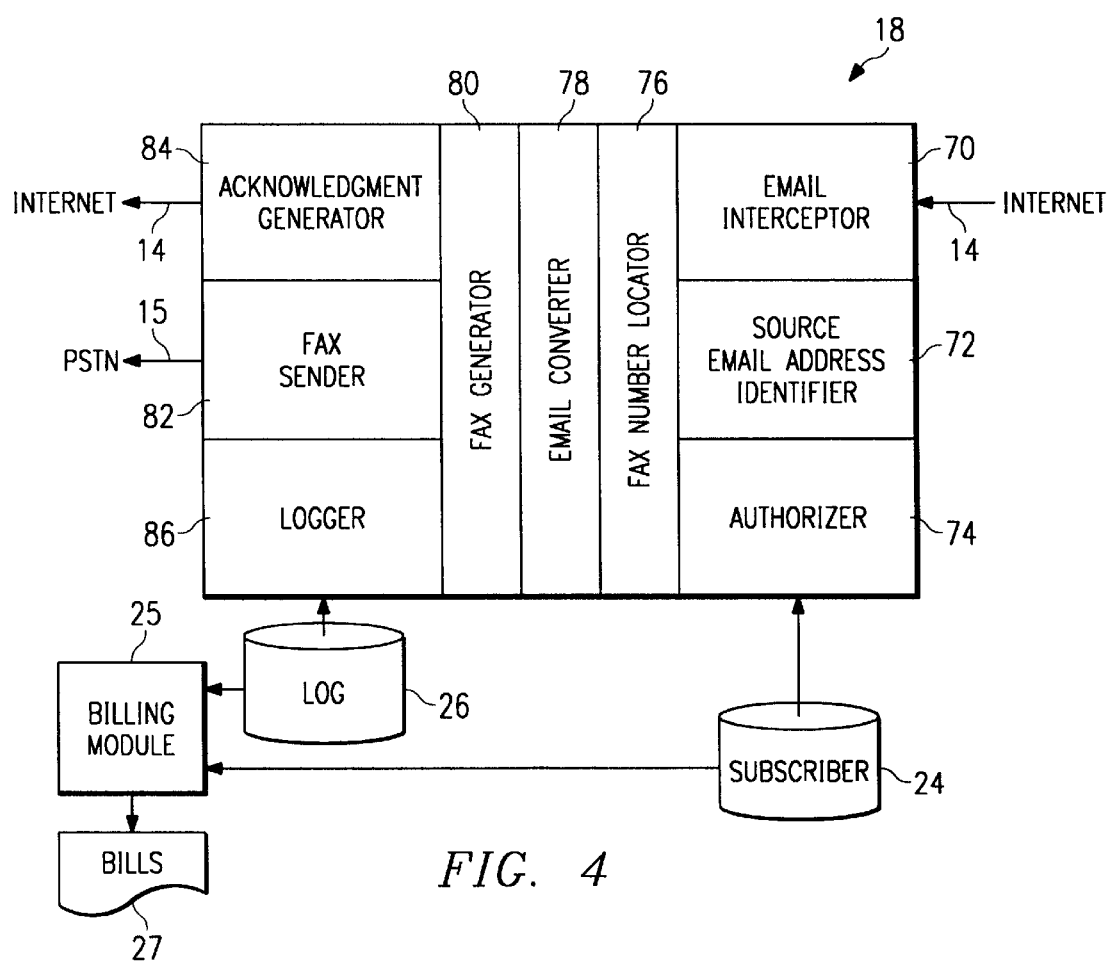
FIG. 4 is a block diagram illustrating a fax/e-mail server with components which may be used to transmit an e-mail message to a fax machine.

FIG. 4 illustrates the component modules of fax/e-mail server 18 which may be used to receive an e-mail message and forward that message to one or more fax machines. Fax/e-mail server 18 includes an e-mail interceptor 70, a source e-mail address identifier 72, an authorization module 74, a fax number locator 76, an e-mail converter 78, a fax generator 80, a fax sender 82, an acknowledgment generator 84, and a logger 86. As with the fax to e-mail component module set, several of the modules in the component module set for the e-mail to fax service of fax/e-mail server 18 may or may not be used dependent upon the configuration of fax/e-mail server 18.

E-mail interceptor 70 receives an e-mail message via Internet 14. E-mail interceptor 70 is coupled to Internet line 22 and has a unique e-mail address assigned to it. E-mail interceptor 70 functions similar to an Internet electronic mail box where messages sent to the assigned e-mail address are received. In order to access the e-mail-to-fax service, users address an e-mail message to a specified e-mail address which is assigned to fax/e-mail server 18. If access to fax/e-mail server 18 is limited or an acknowledgment is desired, source e-mail address identifier 72 locates and stores the source e-mail address from the received e-mail message. If desired, authorization module 74 queries subscriber database 24 using the source e-mail address and determines if the source e-mail address is authorized to send e-mail messages to fax machines. If the subscriber exists in subscriber database 24 and is eligible to send e-mail messages to fax machines, authorization module 74 authorizes the use of fax/e-mail server 18. Otherwise, authorization module 74 denies access. If access is denied, an e-mail message may be sent to the source e-mail address indicating that access to fax/e-mail server 18 was denied.

Fax number locator 76 parses the e-mail message to locate the destination fax telephone number. The e-mail message may contain more than one destination fax telephone number in order to provide a broadcast capability. Broadcast capability refers to sending one e-mail message to several destination fax telephone numbers. Fax number locator 76 will identify all destination fax telephone numbers within the e-mail message. Since the e-mail message is in text format, a simple parsing process can be used to locate the destination fax telephone numbers The provider of the e-mail to fax service may specify the format of the destination fax telephone numbers within the e-mail message. By doing this, the destination fax telephone numbers can be identified quickly and easily.

E-mail converter 78 accepts the e-mail message received by e-mail interceptor 70 and digitizes the e-mail message so that it can be forwarded to a fax machine. Fax generator 80 then accepts the converted e-mail message and destination fax telephone numbers and generates a fax file in a form suitable for transmission to fax machine 10 for each of the destination fax telephone numbers. Fax sender 82 then forwards each generated fax to the destination fax telephone number via PSTN 15.

If desired, acknowledgment generator 84 generates an e-mail message to the source e-mail address indicating that the e-mail message was forwarded to the destination fax telephone numbers. The acknowledgment e-mail message may include at least the date, the time, the number of pages sent, and the destination fax telephone numbers.

If fax/e-mail server 18 is configured so that log file 26 is maintained, logger 86 is invoked to log detailed information regarding the e-mail to fax transaction. Log file 26 may be used to bill subscribers to the e-mail to fax service or it can be used for error detection and correction. As discussed with reference to FIG. 1, an optional billing feature may be part of the inventive system by billing module 25 producing billing invoice 27.

Figure 5:
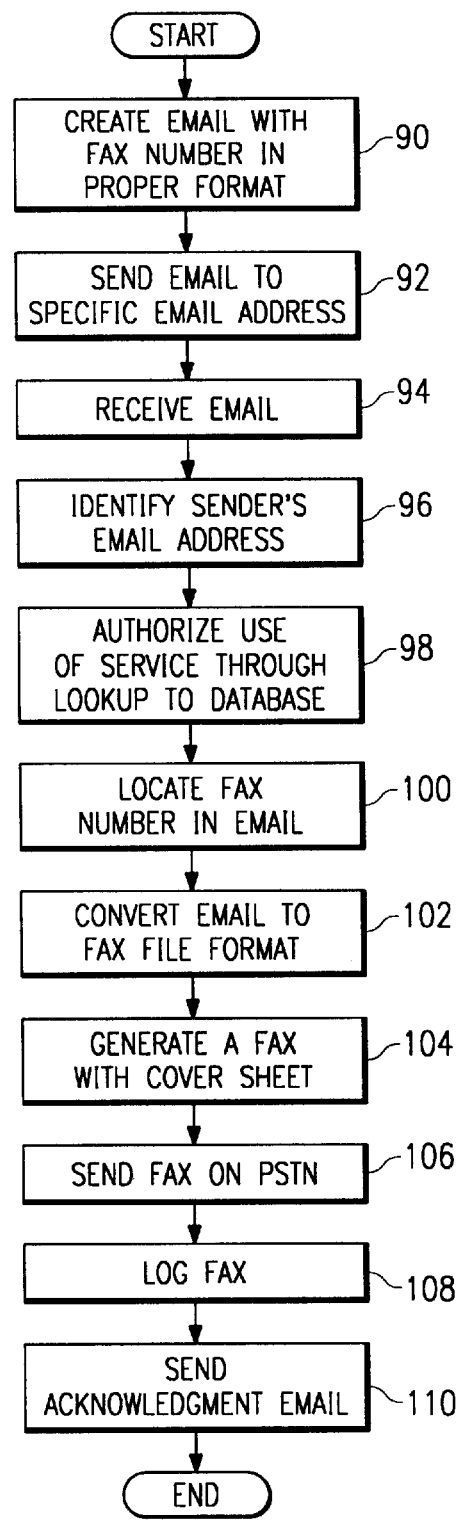
FIG. 5 is a flow diagram illustrating the steps which may be taken to transmit an e-mail message to a fax machine.

FIG. 5 is a flow diagram illustrating a methodology which may be used to send an e-mail message to one or more fax machines. Several of the steps in this method are optional dependent upon the features chosen by the e-mail to fax service provider. For instance, identifying the source e-mail address may be desired if authorization for use of the service is required, an acknowledgment is required, or a log file of all transactions is kept In addition, the e-mail to fax service provider may elect to limit access to fax/e-mail server 18 to subscribers which are maintained in subscriber database 24. However, the service provider could elect to have fax/e-mail server 18 open to anyone. In addition, acknowledgment messages regarding the successful transmission of the e-mail message to a fax machine may or may not be enabled This feature could be turned on or off globally or it could be a feature set chosen by the subscriber and stored in subscriber database 24. Finally, logging the e-mail to fax transaction may be desired depending upon the configuration of fax/e-mail server 18.

The method of sending an e-mail message to one or more fax machines commences at step 90 where an e-mail message is created with one or more destination fax telephone numbers in a proper format that can be decoded by the e-mail to fax service provider. The method then proceeds to step 92 where the e-mail message is sent to a specific e-mail address identifying fax/e-mail server 18. The method then proceeds to step 94 where fax/e-mail server 18 receives the e-mail message.

The method then proceeds to step 96 where the source e-mail address is identified from the information received with the e-mail message. If desired, the method then proceeds to step 98 where subscriber database 24 is queried using the source e-mail address identified in step 96. The results of this query may be used to authorize or deny access to the e-mail to fax service. If access is denied, the service provider may elect to send an e-mail message to the source e-mail address indicating that access to the service has been denied.

The process then proceeds to step 100 where the destination fax telephone numbers are located within the e-mail message Since the e-mail message is in text format, the file can be parsed and examined for existence of destination fax telephone numbers. To facilitate this process, the e-mail to fax service provider may desire that the destination fax telephone numbers appear in a certain format which will guarantee the proper identification of the destination fax telephone numbers.

The method then proceeds to step 102 where the e-mail message received in step 94 is converted into a digital image format suitable for transmission to a fax machine.

The method then proceeds to step 104 where a fax message is generated for each destination fax telephone number which includes the digitized image of the e-mail message. The method then proceeds to step 106 where the fax messages generated in step 104 are sent to the destination fax telephone numbers via PSTN 15. Note that fax/e-mail server 18 may have a built in dialer to facilitate the transmission of the fax message to fax machine 10.

If desired, the method then proceeds to step 108 where details regarding the e-mail to fax transmissions are logged for future use. If desired, the method proceeds to step 110 where an acknowledgment e-mail message is generated indicating that the e-mail message received in step 94 has been sent to the destination fax telephone numbers included therein. The acknowledgment message is then forwarded to the source e-mail address via Internet 14.

According to the teachings of the present invention, a system and method for sending an e-mail message to a fax machine is provided that allows the incompatible technologies of fax and e-mail to be used together. The advantages of utilizing this system include allowing persons connected to the Internet or an Intranet to communicate with persons who have only a fax machine and allowing persons who have only a fax machine to communicate with persons connected to the Internet or an Intranet. It also eliminates a fax card and software from a computer which is needed to receive faxes since those faxes can now be received in an e-mail account.

Thus, it is apparent that there has been provided in accordance with the present invention, an improved system and method for sending an e-mail message to a fax machine that satisfies the advantages set forth above Although the present invention and its advantages have been described in detail, it should be understood that various changes, substitutions, and alterations may be made herein. For example, though e-mail messages may have been described as being sent to and received from Internet network 14, these e-mail messages may also, or alternatively, traverse over an Intranet network such as that established by a business Other examples may be readily apparent to those skilled in the art and may be made herein without departing from the spirit and the scope of the present invention as defined by the following claims.

What is claimed is:

1. A system for sending a fax to an e-mail address, comprising:

a fax interceptor operable to receive a digital image from a source fax machine;

a scanning module coupled to the fax interceptor, the scanning module operable to locate one or more e-mail addresses in the digital image;

an e-mail creator coupled to the fax interceptor and operable to generate an e-mail message for each e-mail address, the e-mail creator attaching the digital image to each generated e-mail message;

an e-mail sender coupled to the fax interceptor, the e-mail sender operable to send the e-mail messages to an e-mail destination identified by the e-mail addresses, a source telephone number identifier operable to identify a source telephone number of the source fax machine;

a database of subscribers of a fax to e-mail service, the database accessible by the source telephone number; and an authorization module operable to determine whether the source telephone number is authorized to transmit a fax to e-mail addresses, the authorization module operable to authorize the sending of the fax to e-mail destinations identified by the e-mail addresses.

2. The system of claim 1, wherein the scanning module uses optical character recognition to locate the e-mail address in the digital image.

3. The system of claim 1, wherein the source telephone number is identified using a caller-id system.

4. The system of claim 1, further comprising an acknowledgment generator coupled to the fax interceptor, the acknowledgment generator operable to generate an acknowledgment fax and to send the acknowledgment fax to the source telephone number.

5. The system of claim 4, wherein the generated acknowledgment includes at least a date, a time, a number of pages received, a number of pages sent, and the e-mail addresses.

6. The system of claim 1, further comprising:
  a log file to track all uses of the fax to e-mail service; and
  a billing module operable to bill subscribers in the database of subscribers for use of the fax to e-mail service.

7. The system of claim 6, wherein subscribers are billed for faxes sent to an e-mail address.

8. The system of claim 7, wherein subscribers are billed for every fax sent to an e-mail address.

9. The system of claim 7, wherein subscribers are billed a flat rate on a periodic basis for access to the service.

10. A method of sending a document to an e-mail address using a fax machine, comprising:
  receiving a digital document image;
  locating one or more e-mail addresses in the digital document image;
  generating an e-mail message addressed to each e-mail address;
  attaching the digital document image to the e-mail message;
  sending the e-mail message according to the e-mail addresses;
  identifying a source telephone number of the digital document image; and
  verifying that the source telephone number allows for the digital document image to be sent via the e-mail message.

11. The method of claim 10, wherein the verifying step includes locating the source telephone number in a database of subscribers.

12. The method of claim 10, further comprising:
  faxing an acknowledgment fax to the source telephone number, the acknowledgment fax including at least a date, a time, a number of pages received, a number of pages sent, and the e-mail addresses.

13. A method of sending a document to an e-mail address using a fax machine, comprising:
  receiving a digital document image;
  locating one or more e-mail addresses in the digital document image;
  generating an e-mail message addressed to each e-mail address;
  attaching the digital document image to the e-mail message;
  sending the e-mail message according to the e-mail addresses;
  identifying a source telephone number of the digital document image; and
  tracking each time a digital document image from the source telephone number is sent via the e-mail message.

14. The method of claim 13, wherein the tracking step includes writing usage information to a log file including at least a date, a time, a number of pages received, a number of pages sent, a source telephone number, and the e-mail addresses.

15. The method of claim 13, further comprising:
  billing subscribers to the fax to e-mail service for use of the fax to e-mail service.

16. The method of claim 15, wherein the billing step includes billing subscribers for every use of the fax to e-mail service.

17. The method of claim 15, wherein the billing step includes billing subscribers a flat fee on a periodic basis for access to the service.

18. The method of claim 13, further comprising:
  faxing an acknowledgment fax to the source telephone number, the acknowledgment fax including at least a date, a time, a number of pages received, a number of pages sent, and the e-mail addresses.

\* \* \* \* \*